United States Patent [19]
LaPointe et al.

[11] Patent Number: 5,816,672
[45] Date of Patent: Oct. 6, 1998

[54] THREE-POSITION LOCKING MECHANISM

[75] Inventors: Brion E. LaPointe, Sunnyvale; William M. Becker, San Carlos, both of Calif.

[73] Assignee: Apple Computer, Inc., Cupertino, Calif.

[21] Appl. No.: 563,772

[22] Filed: Nov. 28, 1995

[51] Int. Cl.$^6$ ................................................ A47B 96/00
[52] U.S. Cl. ...................... 312/223.2; 312/219; 292/34
[58] Field of Search .................................. 312/217, 218, 312/219, 216, 350, 223.2, 223.1; 49/449, 450; 292/5, 34, 8, 724, 726, 725, 727, 732, 829, 683

[56] References Cited

U.S. PATENT DOCUMENTS

| 3,238,003 | 3/1966 | Stark | 312/219 |
|---|---|---|---|
| 3,851,939 | 12/1974 | Benasutti et al. | 312/350 X |
| 4,804,238 | 2/1989 | Bischof et al. | 312/138.1 |
| 5,116,261 | 5/1992 | Lan et al. | 312/292 |
| 5,169,218 | 12/1992 | Chu | 312/223.2 |

FOREIGN PATENT DOCUMENTS

| 3608057 | 9/1987 | Germany | 361/683 |

*Primary Examiner*—Jose V. Chen
*Assistant Examiner*—Janet M. Wilkens
*Attorney, Agent, or Firm*—Blakely, Sokoloff, Taylor & Zafman

[57] ABSTRACT

An apparatus and a method for securing a component in an electronics housing utilizing an apparatus including a rail attached to a side portion of an electronics housing, a door slidably coupled to the rail, a bezel coupled to the electronics housing and covering a portion of the rail, and a multiple position locking mechanism coupled to the rear of the bezel. The apparatus is used to cover and secure the external components of a server wherein the server contains one or more removable external components that are data drives and the media in those data drives. The locking mechanism includes a rotatable switch lock connected to an axial moving link that rotates a specially designed shaft that contains predetermined locking locations to contact a protruding rib portion of the door and hold or lock the door in a particular position. The multiple position locking mechanism contemplates that the door will be locked in such a position so as to prohibit the removal of the external components completely or alternatively prohibit removal of the external components that are, for example, the data drives, but allow the removal from the electronics housing of the external components that are the media within those drives. Thus, for example, there is a locking position of the door such that a floppy disk on CDROM is removable, whereas the drives that cover the media are not removable.

9 Claims, 9 Drawing Sheets

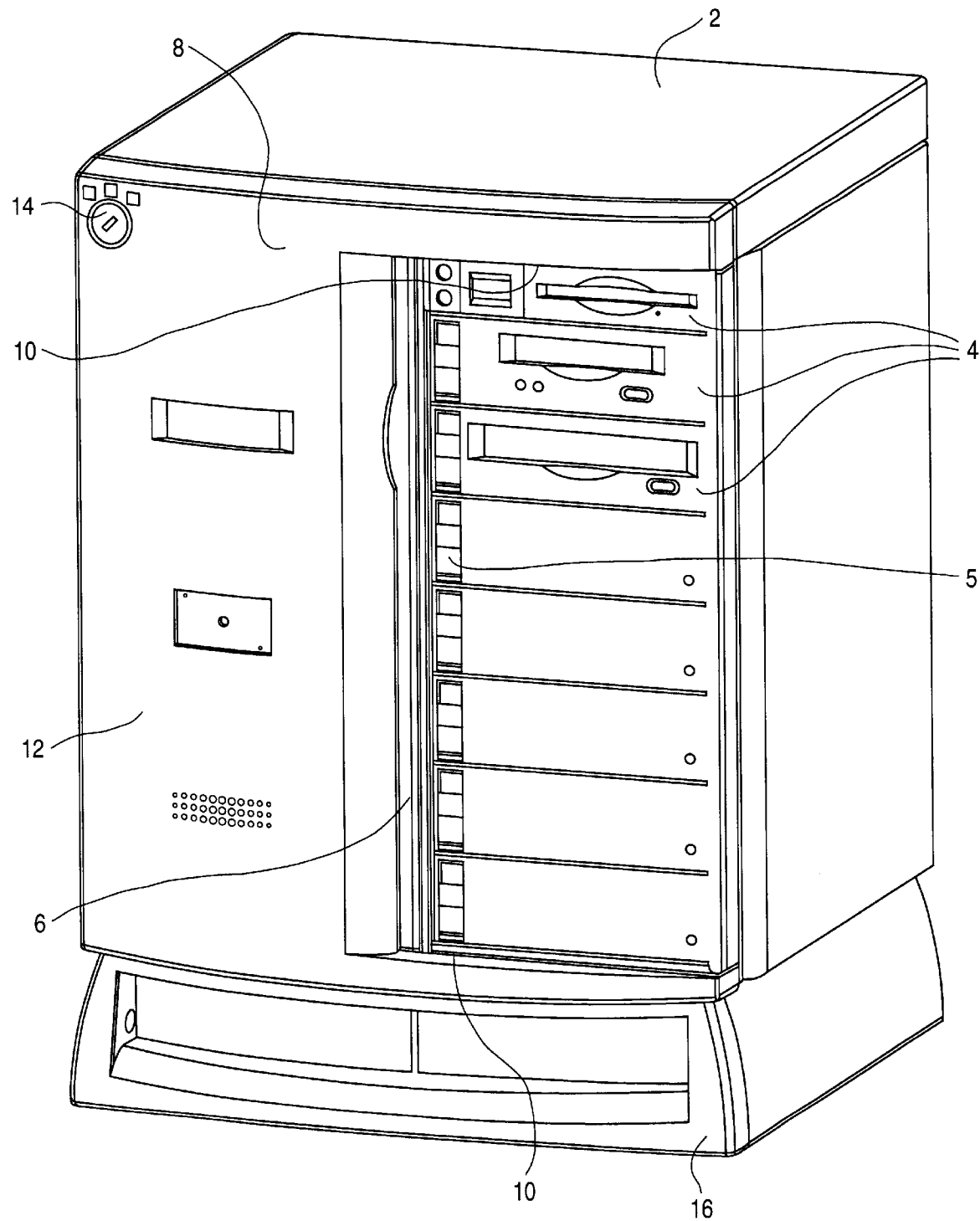
FIG_1A

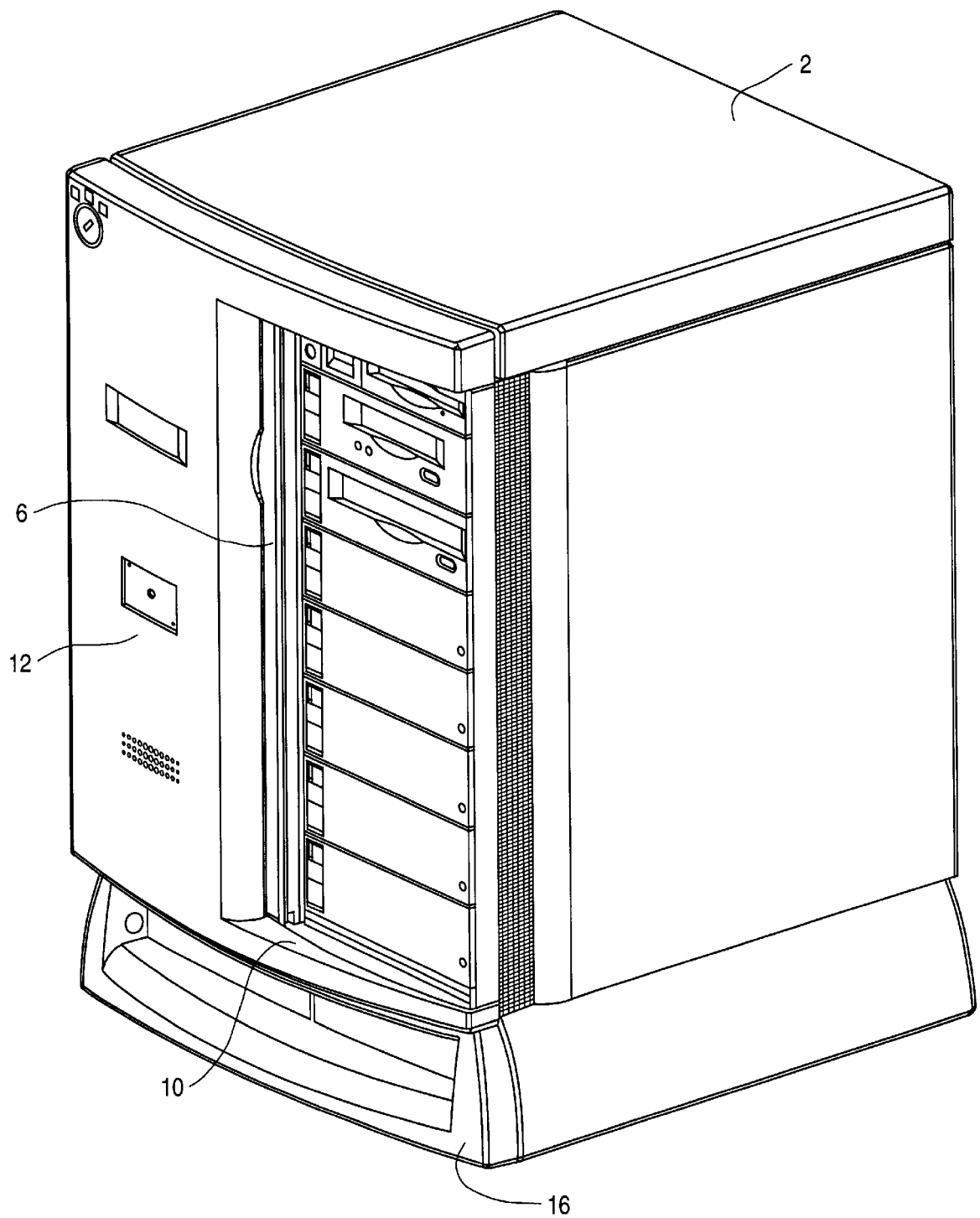
FIG_1B

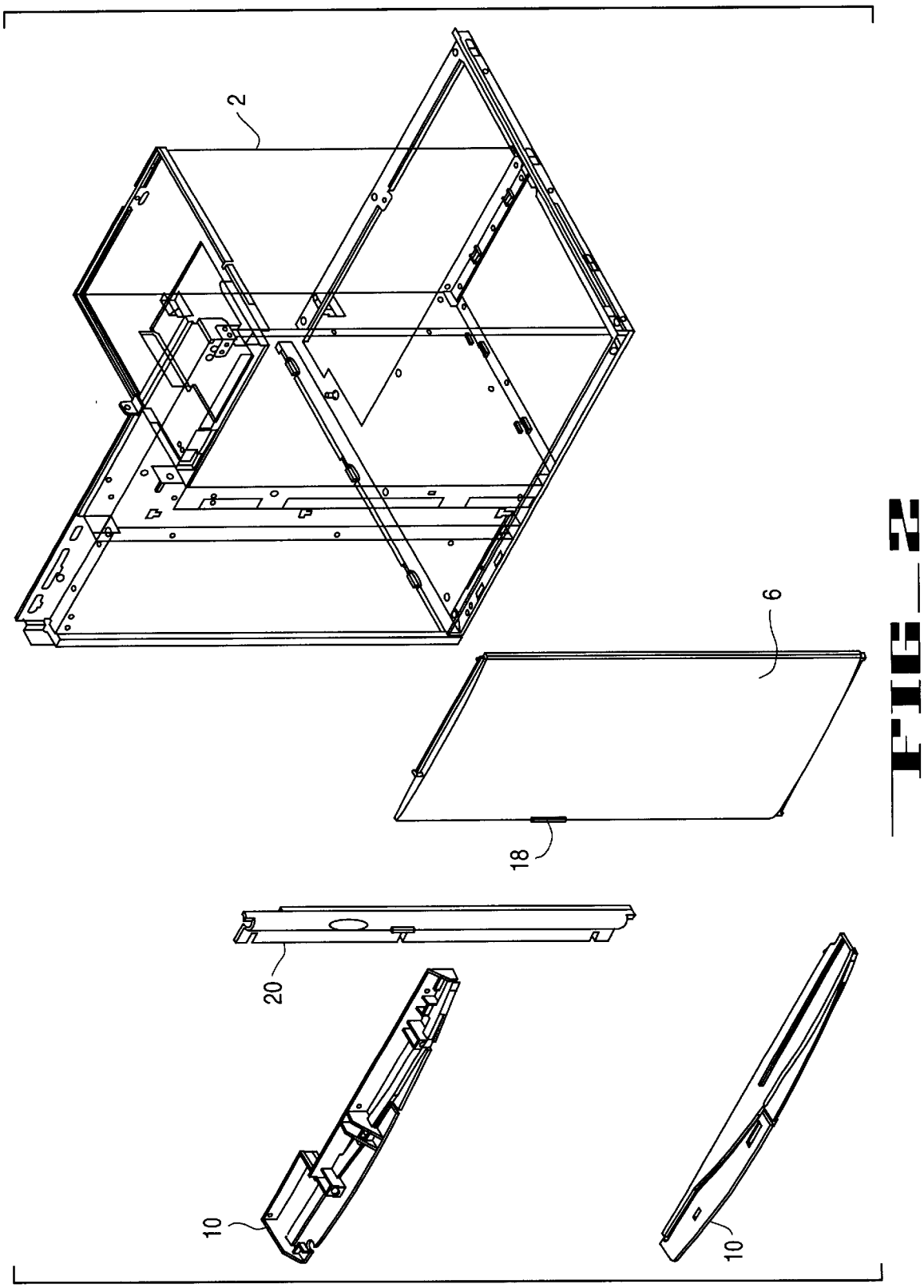

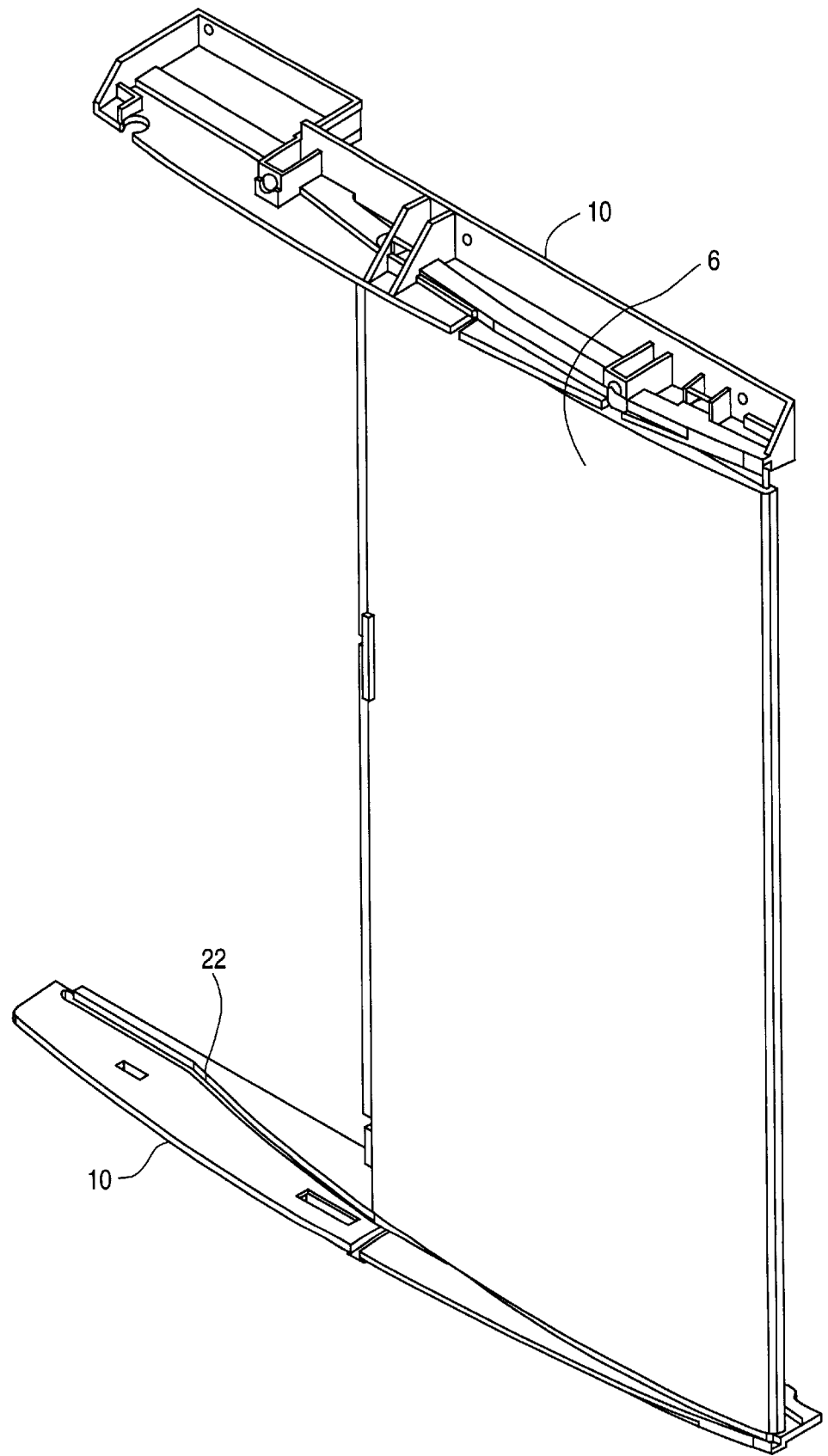
FIG_3

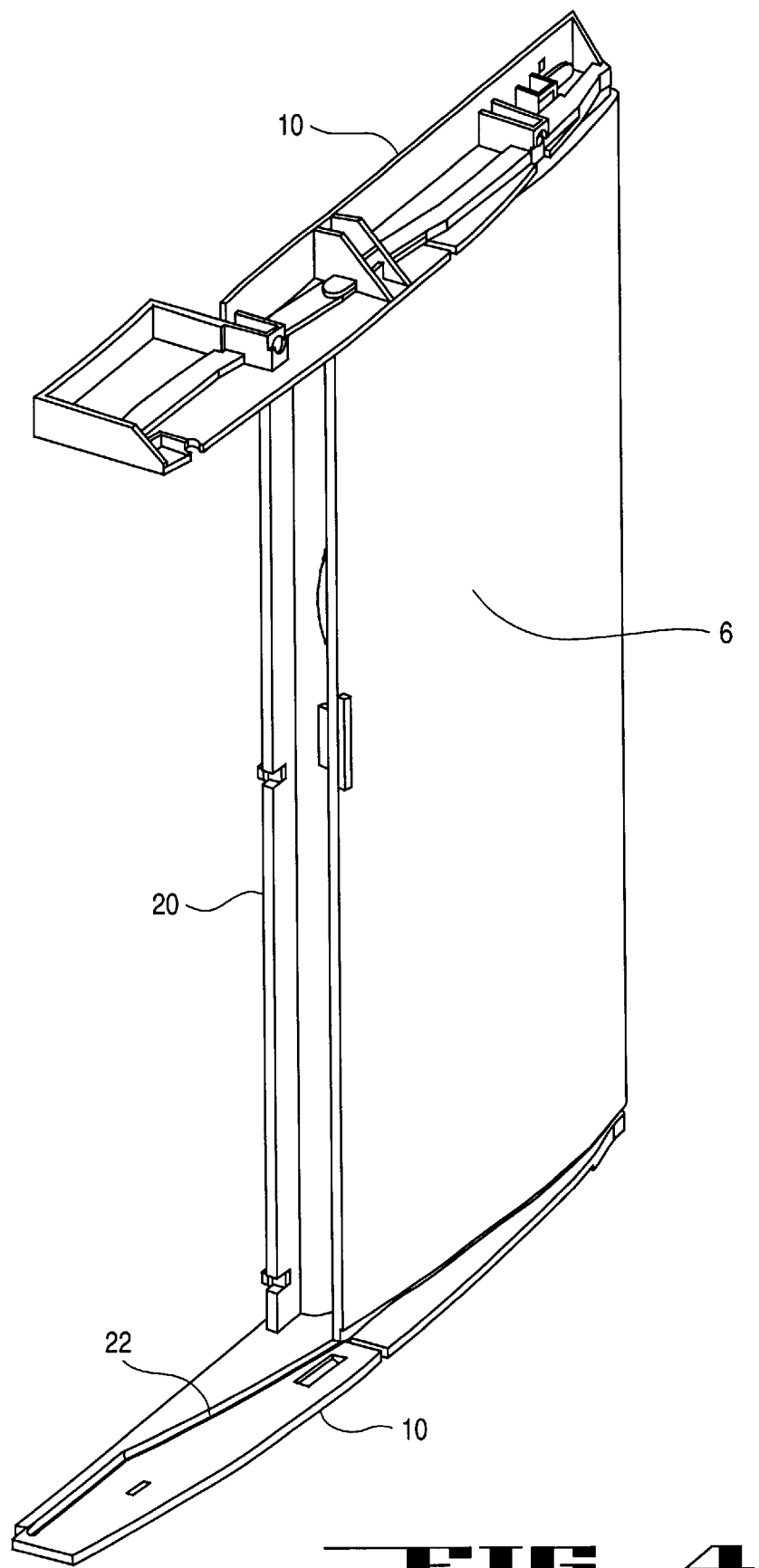
FIG_4

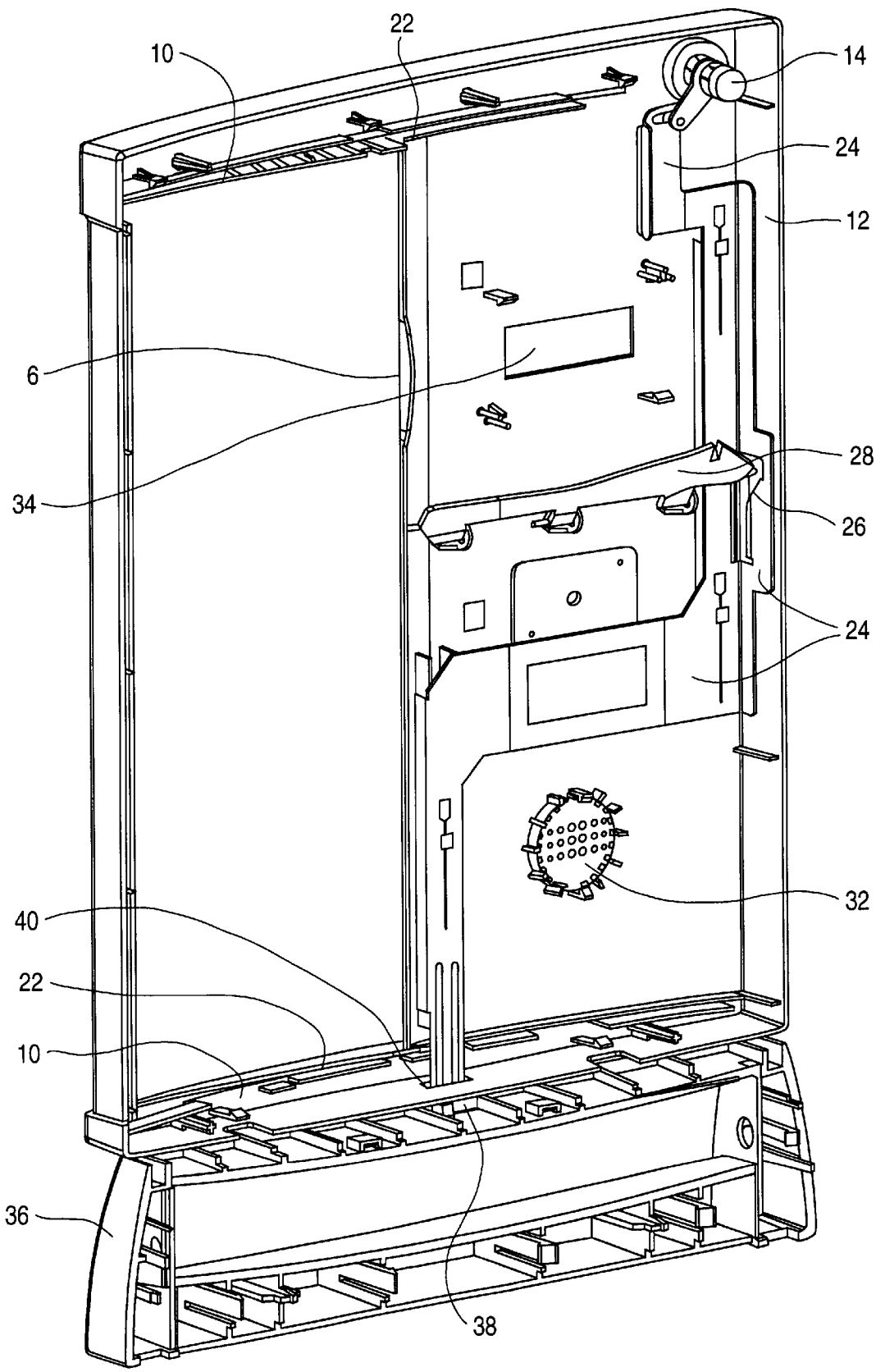
FIG_5

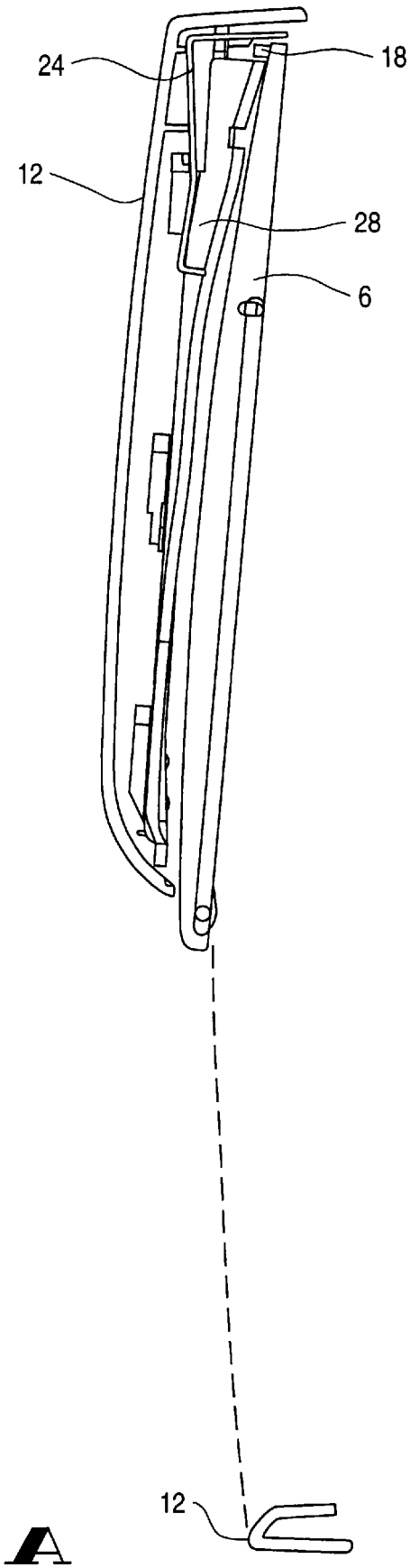
FIG_6A

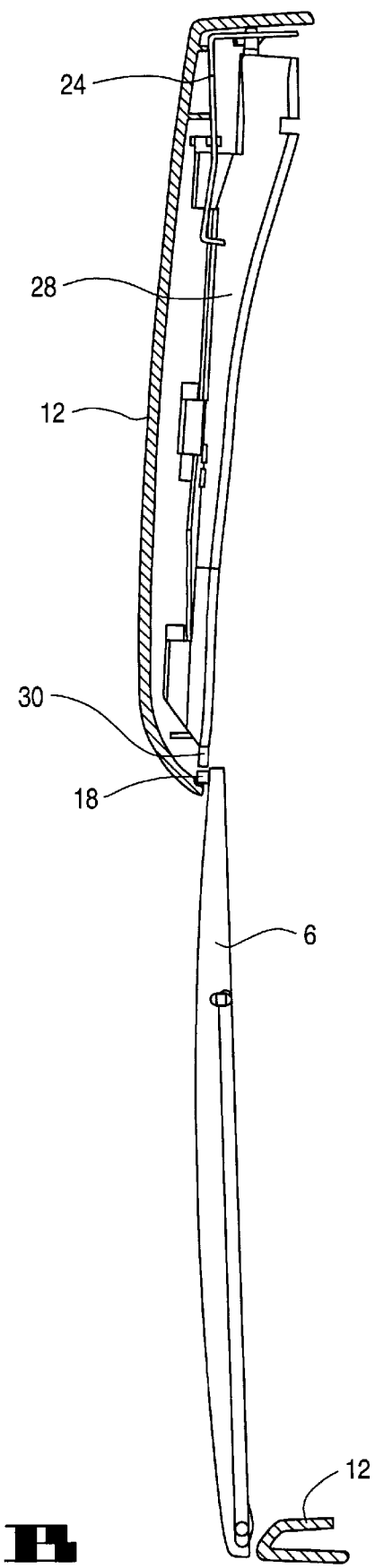
FIG_6B

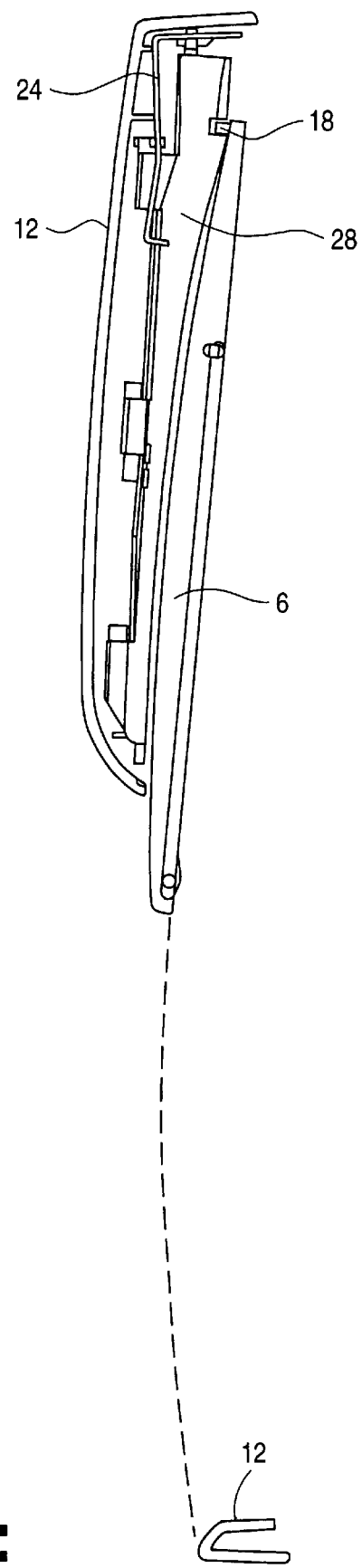
FIG_6C

THREE-POSITION LOCKING MECHANISM

FIELD OF THE INVENTION

The invention relates generally to components in a computer electronics housing and more particularly to securing access to components in a computer electronics housing.

BACKGROUND OF THE INVENTION

Computer electronics housing, or "electronics housing", refers to any unit capable of holding, storing, or containing electronic computer components. Examples of electronics housings include, but are not limited to, stand-alone computer modules, controller cabinets or consoles, server cabinets or consoles, relay rack enclosures, and data storage cabinets. External components held, stored, or contained in an electronics housing include, but are not limited to, monitors, like data drives, media in data drives (i.e., disks, CD-ROM, DAT tapes), and audio speakers. Internal components include, but are not limited to, microprocessors, co-processors, power supplies, and auxiliary printed circuit boards.

The external components of an electronics housing are directly accessible and generally removable from the electronics housing without disassembly of the housing. For example, a floppy disk is an electronic media external component that is removable from a disk drive external component, an externally removable floppy disk drive is an external component that is removable, and an audio speaker is an external component that is generally removable from an electronics housing without the disassembly of the housing.

Some electronics housings are enclosed to protect against dust and the uninvited. Typical enclosure mechanisms include removable panels and hinged doors. Removable panels are fastened to the electronics housing by conventional screws or quick-release fasteners. Hinged doors are fastened to the electronics housing by conventional hinges on a side of the housing. The panels are awkward because the panels must be removed and located elsewhere when access to the electronics housing is needed. Likewise, the hinged door enclosure apparatus can be awkward if the space requirements are minimal.

Electronics housings can have locking mechanisms. The typical locking mechanism is a key lock that actuates a cantilever arm to a position between the door or panel and the housing so as to prohibit the opening of a door or the removal of a panel.

The electronics housings of servers or controllers are types of electronics housings that generally comprise multiple data drive external components compatible with several types of external media (i.e., floppy disk, CD-ROM, and DAT media). Servers and controllers are not generally enclosed. Failure to secure the electronics housing that is a server or controller exposes the multiple external components (i.e., driver and media) to damage through dust, and risks the components to tampering or removal by the uninvited.

There is a need for an apparatus to enclose and secure components, particularly external components, in an electronics housing. There is a need for an apparatus that encloses an electronics housing yet provides easy access to the external components when the need arises. Such easy access should not entail the removal of panels or the swinging open of bulky space-consuming doors. Further, there is a need for an effective locking mechanism that secures external components in an electronics housing away from the uninvited.

SUMMARY AND OBJECTS OF THE INVENTION

The invention relates to an apparatus and a method for securing a component in an electronics housing. The apparatus is comprised of at least one rail attached to a side portion of the electronics housing, a door slidably coupled to the rail, a bezel coupled to the electronics housing and covering a portion of the rail and also covering a portion of the door, and a locking mechanism coupled to the rear of the bezel. The apparatus is designed to cover or encapsulate a component or multiple components within the electronics housing and the door so that a component or components are accessible by sliding the door in the rail behind the bezel. In a preferred embodiment, the door is made of a transparent material, like transparent plastic or acrylic, so that components within the electronics housing are visible but not susceptible to dust or the uninvited.

The invention also relates to an apparatus that is a locking mechanism capable of locking a sliding door in multiple positions. The sliding door can be locked by the locking mechanism in the fully open position, any number of partially open positions, or the fully closed position. The apparatus contemplates that the locking mechanism is entirely mechanical and can be open or closed without a power source.

The invention is an apparatus that encloses an electronics housing but allows easy access to the external component or components and their removable media. The invention contemplates that the door slides along a rail in front of the electronics housing. Because the door simply slides away to expose external components, access to the components is much easier than systems that utilize detachable panels to cover the electronics housing. Further, the sliding door feature of the invention permits the invention to be used in an electronics housing located in a very small space where the space requirements associated with a hinged door would be unacceptable.

The invention is a particularly useful apparatus to cover and secure the external components of a server or a controller. A server contains many external components that are data drives as well as the media in those data drives (i.e., disk, CD-ROM, DAT). Similarly, a controller might contain several drives as well as several relay cards. These external components, the drives, the media, and the relay cards are generally removable directly from a side of the electronics housing without removing housing components like backings or panels. The invention contemplates that the electronics housing of servers and controllers contain an apparatus that covers and secures the external components from dust or the uninvited. The multiple position locking mechanism contemplates that the door will be locked in such a position so as to prohibit the removal of the external components completely or alternatively prohibit removal of the external components that are, for example, the data drives, but allow the removal from the electronics housing of the external components that are the media within those drives. Thus, for example, the invention contemplates a locking position of the door such that a floppy disk or a CD-ROM medium is accessible and removable, but the external component drives that process the media are not removable.

BRIEF DESCRIPTION OF THE DRAWINGS

The invention is illustrated by way of example and not limitation in the figures of the accompanying drawings, in which like references indicate similar elements and in which:

FIG. 1 is a front perspective view of the apparatus of the invention coupled to an electronics housing that is a server;

FIG. 1(b) is a side perspective view of the apparatus of the invention coupled to an electronics housing that is a server;

FIG. 2 is an exploded perspective view of the door, a pair of rails, and the shroud attached to an electronics housing that is a server;

FIG. 3 is an isolated front perspective view of a pair of rails and the door of the invention;

FIG. 4 is an isolated front perspective view of the pair of rails, the door and the shroud of the invention;

FIG. 5 presents a rear perspective view of the apparatus of the invention including locking mechanism coupled to the bezel;

FIGS. 6A–6C are planar views of the apparatus of the invention specifically presenting a section of the bezel, the locking mechanism, and the door, wherein:

FIG. 6A presents the door locked in a fully open position;

FIG. 6B presents the door locked in a closed position and

FIG. 6C presents the door locked in a partially open position.

DETAILED DESCRIPTION

The invention relates to an apparatus for securing a component in an electronics housing. The apparatus is comprised of a rail attached to a side portion of the electronics housing, a door slidably coupled to the rail, a bezel coupled to the electronics housing and covering a portion of the rail and covering a portion of the door, and the locking mechanism coupled to the rear of the bezel.

The invention also relates to an apparatus that is a locking mechanism capable of locking a sliding door of an electronics housing in multiple positions. In one embodiment, the sliding door can be locked by the locking mechanism in the fully open, partially open, or fully closed position. The invention contemplates that the locking mechanism is coupled to the rear (or interior) of a bezel, the bezel attached to a portion of the electronics housing with the rear or interior portion of the bezel adjacent to a sliding door. The locking mechanism includes a rotatable switch lock connected at the rear of the bezel to an axially actuated link. The link contains a cammed surface upon which a rotating shaft rests. The switch lock actuates the link, the link in turn rotates the shaft to lock the sliding door in one of potentially several positions. The shaft accomplishes the task of locking or holding the sliding door in a particular position by rotating into the path of a portion of the door containing a protruding rib. The shaft is specially designed to contain certain predetermined locking locations to contact the protruding rib of the door and hold or lock the door in a particular predetermined position.

The invention is particularly useful for securing the external components of a server or controller. A typical server, for example, might contain external components comprised of several data drives (i.e., disk, CD-ROM, DAT) and the media in those drives. These external components (i.e., the drives and the media within the drives) are generally removable from a side of the electronics housing. The invention would also be useful for securing electronic components in electronics housings that are not computer related, like stereo or television cabinets or consoles. The invention relates to an apparatus that covers the external components in the electronics housing and secures the external components from access by the uninvited.

FIG. 1 presents a front perspective view of an electronics housing that is a server. The electronics housing 2 contains several external components 4 that are data drives (i.e., disk, CD-ROM, DAT) and the media within the data drives. The external components 4 are coupled to the front side of the electronics housing 2 and are accessible and removable therefrom. The data drives are held in place by latches or device lockdowns 5 that are releasable from the front side of the electronics housing 2. When the latch 5 is released, the data drive external component 4 can be slid out and removed through the front side of the electronics housing 2 without disassembly of the server 2. This type of latch or device lockdown 5 allows "hot-swappable" applications whereby the drive can be removed while the system is in operation.

FIG. 1 shows the bezel assembly 8 coupled to the front side of the electronics housing 2. The bezel assembly 8 comprises a pair of rails 10 coupled to the electronics housing 2, a transparent door 6 slidably coupled between the pair of rails 10 (only bottom rail visible), and a bezel 12 coupled both to the pair of rails 10 and to the electronics housing 2 and covering a portion of the pair of rails 10 and a portion of the transparent door 6. FIG. 1 shows the apparatus of the invention 8 with a pair of rails 10 (top and bottom). The invention also contemplates an assembly utilizing a single rail, e.g., a bottom rail alone.

FIG. 1 presents a view of the door assembly 8 with the door 6 in the open position. The door 6 is opened and the external components 4 exposed by sliding the door 6 along the pair of rails 10. The invention contemplates that the pair of rails 10, for the door 6 to slidably travel upon, extend behind the bezel 12. Thus, as the door 6 is opened, the door 6 slidably moves in the pair of rails 10 behind the bezel 6 until the external components 4 are completely exposed.

FIG. 1 presents a partial view of the apparatus of the invention that is the locking mechanism. In this embodiment, the locking mechanism includes a switch lock 14 attached to the front of the bezel 12. According to the invention, rotating the switch lock 14 actuates the locking mechanism to lock the door 6 in a desired position.

FIG. 1 also presents a second door or a plinth door 16 that covers and secures additional external components. An example of an external component that might be stored behind the plinth door 16 is a removable power supply. In the particular embodiment depicted, the server 2 contains a pair of removable power supplies covered and secured by the plinth door 16. The invention contemplates that the locking mechanism locks the sliding door 6 and secures the external components 4 and simultaneously locks the plinth door 16 to secure an external component behind the plinth door 16.

FIG. 1(b) presents a side perspective view of an electronics housing that is a server. FIG. 1(b) further illustrates the bezel assembly of the invention, including a pair of rails 10 (only bottom rail visible), a door 6 slidably coupled between the pair of rails 10, and a bezel 12 coupled to the pair of rails 10 and to the electronics housing 2. FIG. 1(b) also illustrates the plinth door 16 that covers a pair of power supplies.

FIG. 2 shows an exploded perspective view of a portion of the apparatus of the invention, specifically demonstrating the door 6 and the pair of rails 10. The pair of rails 10 attach to the top and bottom of the front side of the electronics housing 2. The door 6 is slidably coupled between the pair of rails 10 and slides along tracks in the pair of rails 10 to expose and cover the external components. The door 6 depicted in FIG. 2 includes a rib 18 that functions in accordance with the locking mechanism to lock the door in a particular position. The operation of the locking mechanism is described in detail below with reference to FIGS. 5 and 6A, 6B, and 6C.

FIG. 2 also presents a shroud 20 that attaches to the electronics housing 2. The shroud 20 is located against the electronics housing 2 behind the bezel (not shown) and the door 6. The shroud 20 restricts the door 6 from being deflected or forced toward the electronics housing 2 and provides an attractive complete appearance to the apparatus.

FIG. 3 is an isolated front perspective view of the pair of rails 10 and the door 6 of the door assembly. FIG. 3 demonstrates the door 6 slidably coupled between the pair of rails 10 in a track 22. The door 6 slides along the track 22 in the pair of rails 10. In the particular embodiment, the track 22 is curved to correspond with the particular design of the server. The invention is not limited to an apparatus that includes a pair of rails 10 with a curved track. Instead, the invention contemplates paths of many different shapes including curved or straight to correspond to the shape of the electronics housing and the tolerances required for effective operation.

FIG. 3 does not show the bezel portion of the apparatus. Nevertheless, FIG. 3 shows the door 6 in the closed position wherein the door would cover and secure external components. To open the door 6, the door is slid along tracks 22 behind a bezel. In FIG. 3, the bezel portion of the invention is not shown to better illustrate the path of the door 6 between the pair of rails 10.

FIG. 4 presents a second isolated front perspective view of the pair of rails 10 and the door 6 of the door assembly. FIG. 4 again demonstrates the door 6 slidably coupled between the pair of rails 10 in a track 22. FIG. 4 also includes a shroud 20 coupled to the electronics housing and located between the door 6 and a bezel. Once again, the bezel is not pictured so that FIG. 4 may illustrate the path of the door 6 between the pair of rails 10. As noted above, the shroud 20 prevents the door 6 from being deflected or forced backward toward the electronics housing and provides an attractive complete appearance to the invention when it is coupled to the electronics housing.

FIG. 5 presents a rear perspective view of the door assembly. FIG. 5 shows a pair of rails 10 that are coupled to the electronics housing (not shown), a transparent door 6 slidably coupled between the pair of rails 10, the door capable of sliding in the tracks 22 of the pair of rails, and a bezel 12 coupled to the pair of rails 10 and surrounding the door 6. The rear of the bezel 12 contains the multi-position locking mechanism. The bezel 12 also has a location 32 for an audio speaker and a location 34 for an LED display. The apparatus is coupled to a side of an electronics housing (not shown) to cover and secure external components (not shown) in the electronics housing. Coupling mechanisms include, but are not limited to, screws, snap or formal fit, or glue.

FIG. 5 also shows the locking mechanism apparatus. In this embodiment, the invention contemplates that the locking mechanism includes a rotatable switch lock 14 that can be a keylock extending from the front of the bezel 12 and coupled at the rear of the bezel to an axially actuated link 24. In the preferred embodiment, the link 24 is made of sheet metal, but the invention contemplates that the link 24 may be made of any durable material like most metals or hard plastics. The preferred apparatus contemplates that the locking mechanism is entirely mechanical and can be opened or closed without a power source. One of ordinary skill in the art will recognize that a power source can be included to actuate the link and such a use of a power source would not deviate from the scope and spirit of the invention.

The link 24 includes a cam surface 26 upon which a rotating shaft 28 rests. Specifically, in the embodiment presented, the rear of the switch lock 14 is attached to a pawl, the pawl containing a pin that connects the pawl to the link 24. Actuating the switch lock 14 to a first or second position turns the pawl in a radial position, the pawl, through the pin, in turn, actuates the link 24 to move the link 24 in an axial actuation (up or down) to a first or second position. The shaft 28 rests with spring tension against the cam surface 26 of the link 24 profile. As the link 24 is axially actuated, the shaft 28 rotates in response to the movement of the cam surface 26 of the link 24. To lock the door 6, the link 24 is moved downward causing the shaft 28 to rotate from a first position, where the length of the shaft 28 is approximately parallel to the bezel 12, to a second position where the length of the shaft 28 is approximately perpendicular to the bezel 12. When the shaft 28 is in the perpendicular position, the shaft 28 can hold or lock the door 6 in one of potentially several positions.

The shaft 28 accomplishes the task of locking the door 6 in a particular position by rotating into the path of a rib on the door 6. The shaft 28 contains certain predetermined locking locations that constrain the rib on the door 6 at those locations and hold and lock the door 6 when the shaft 28 is in the locking/perpendicular position. With the exception of the rib on the door 6, a preferred embodiment of the apparatus contemplates that no other portion of the door 6 contacts the shaft 28, the link 24, or the bezel 12. Consequently, the invention contemplates that the door 6 will not be scratched or scuffed since the door 6 does not contact any portion of the apparatus.

In the electronics housing that is a server shown in FIG. 1, the server contains a power supply or power supplies at its base, the power supply or power supplies covered by a plinth door. The apparatus depicted in FIG. 5 contemplates that the locking mechanism that locks the door simultaneously locks the plinth door 36. According to this embodiment, the plinth door 36 has a hole 38 in its side or face portion. The hole in the side or face portion of the plinth door corresponds to a similar hole 40 in the bezel 12 that aligns with the link 24 of the locking mechanism. As the link 24 is axially actuated downward to the lock position, the bottom portion of the link 24 extends through the hole 40 in [the bezel, through the hole in] the bottom rail 10 and through the hole 38 in the top portion of the plinth door 36 to lock the plinth door and secure the power supply or power supplies. Thus, the same locking mechanism and locking action that locks the door and secures external components, locks the plinth door 36, and secures the external components that are, for example, the power supply or power supplies.

FIG. 6 presents a top-view of the apparatus of the invention, specifically presenting the bezel 12, the locking mechanism, and the door 6. The rail or rails are not presented so that a detailed presentation of the locking mechanism can be demonstrated.

In FIG. 6A, the door 6 is locked in the fully open position, almost completely encapsulated within the bezel 12. In the locked position, the link 24 has rotated the shaft 28 to a position whereby the length of the shaft 28 is in an approximately perpendicular position relative to the bezel 12. In the fully open position, the rib 18 of the door 6 is positioned between the link 24 and the shaft 28. The door 6 is locked in the open position because the rib 18 cannot move past the shaft end 28. In this embodiment, when the door is locked in the fully open position, no portion of the door 6, other than the rib 18, contacts any other portion of the apparatus.

FIG. 6B shows the door 6 locked in the fully closed position. In the locked position, the link 24 has again rotated the length of the shaft 28 to an approximately perpendicular position. In the fully closed position, the rib 18 of the door 6 is encapsulated or covered within the bezel 12 such that, when the door 6 is locked, the rib 18 is positioned between the bezel 12 and a boss 30 on the end of the shaft 28. The door 6 is locked in the closed position because the rib 18 cannot move past the boss 30 on the shaft 28. In this embodiment, when the door 6 is locked in the fully closed position, no portion of the door, other than the rib 18, contacts any other portion of the apparatus.

FIG. 6C shows the door 6 locked in a partially open position. In the locked position, the link 24 has again rotated the shaft 28 to an approximately perpendicular position. In the partially open position, the rib 18 of the door 6 fits within a gap in the shaft 28, such that when the rib 18 is within the gap in the shaft 28, the door 6 cannot move toward open or closed. A detent in the track can be included to allow the operator to be cognizant of the partially open locking position when the operator moves the door 6 along the rails.

In the preferred embodiment, the rib 18 of the door 6 is positioned within the gap in the shaft 28 without any portion of the door 6 contacting any other portion of the apparatus. This is accomplished regardless of whether the door 6 is particularly positioned in the partially open position before the locking mechanism is actuated to lock the door 6 (i.e., before the shaft 28 is rotated to an approximately perpendicular position relative to the bezel 12). According to the preferred embodiment, the shaft 28 rests with spring tension on the cam surface of the link 24. The tendency of the shaft 28 is to rotate about its length 180° from its first unlocked position approximately parallel to the bezel 12 to a second position also approximately parallel to the bezel 12. Only the cam surface of the link 24 prevents the rotation and restricts the rotation of the length of the shaft 28 to approximately 90° (i.e., from approximately parallel to approximately perpendicular relative to the bezel 12 and vice versa). The invention contemplates that the shaft 24 has a first or unlocked (approximately parallel) position and a second locked (approximately perpendicular) position. In the preferred embodiment, the shaft 24 contemplates a third position whereby the shaft rotates slightly beyond the locked position, in the direction toward a 180° rotation, only when the door 6 is positioned in the partially open position. Thus, if the locking mechanism is locked when the door 6 is between the fully closed position and the partially open position or between the fully open position and the partially open position, the shaft 28 will rotate to the second position. When the shaft 28 is in the second position, the door 6 can slide along the track between the pair of rails and not contact the shaft 28 or any other portion of the apparatus until such time as the door 6 is in the fully open, fully closed, or designated partially open position. When the door 6 reaches the partially open position (i.e., when the rib of the door aligns with the gap in the shaft 28), the shaft 28 rotates forward slightly, its tendency, to a third position trapping the rib 18 of the door 6 and locking the door 6. By adding this third position for the shaft 28, the door 6 can slidably travel along the tracks in the pair of rails without contacting any portion of the apparatus thereby eliminating potential scratching or scuffing of the body of the door 6 by the locking mechanism.

The partially open locking position illustrated in FIG. 6C is particularly useful in servers with removable external components such as data drives and the media in those drives. Removable data drives (e.g., disk drive, CD-ROM drive, DAT drives) that are removable from the front side portion of the server are known in the art. One type of these data drives has a latch on the front portion of the drive to secure the data drive within the server. To remove the data drive, the latch is lifted and the data drive can be guided or slid out of the front side portion of the server.

In the preferred embodiment of the invention, the locking mechanism includes a partially open locking position wherein the door 6 is locked such that the door covers or encapsulates the data drive securing latch, so that the latch cannot be opened and the data drive removed. This invention further contemplates that although the data drives themselves cannot be removed when the door 6 is locked in the partially open locking position, the media within those drives (i.e., disk, CD-ROM, DAT tape) can be accessed and removed.

The invention described in the embodiment that is a server contemplates that the locking mechanism locks the door in three positions: fully open, fully closed, or partially open. As evidenced by the above discussion, the invention does not contemplate being limited to only three locking positions for the sliding door. It is evident that the locking mechanism can lock the door in any number of finite positions. For instance, it is evident that another gap or gaps can be included along the shaft to hold and lock the door in other contemplated positions.

The invention contemplates that the door can be locked only in the desired position. In the preferred embodiment that is a server, three positions were chosen. The invention contemplates that the locking mechanism can be actuated to the locked position regardless of where the door is located (i.e., regardless of whether the door is fully open, fully closed or designated partially open). The invention contemplates that once the locking mechanism is placed in the locked position and the door is not in a designated locking position, the door can slide between designated locking positions until the door reaches a designated locking position at which time the door is locked.

In the preceding detailed description, the invention is described with reference to specific exemplary embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An electronics housing having an apparatus for securing a component in the electronics housing, the apparatus comprising:

a rail attached to a side portion of the electronics housing;

a door slidably coupled to the rail, the door having a first position, a second position, and a third position;

a bezel with a front portion and a rear portion wherein the bezel is coupled to the electronics housing and covers a portion of the rail; and an actuatable locking mechanism coupled to the rear portion of the bezel, the locking mechanism having a locked position wherein in the locked position, the locking mechanism locks the door in either the first position, the second position, or the third position.

2. An electronics housing having an apparatus for securing a component in the electronics housing, the apparatus comprising:

a rail attached to a side portion of the electronics housing;

a door slidably coupled to the rail, the door having a first position, a second position, and a third position;

a bezel with a front portion and a rear portion wherein the bezel is coupled to the electronics housing and covers a portion of the rail; and an actuatable locking mechanism coupled to the rear portion of the bezel, the locking mechanism having a locked position wherein in the locked position, the locking mechanism locks the door in either the first position, the second position, or the third position, wherein the locking mechanism of the apparatus includes, a rotatable switch lock;

an axially actuated link having a first end and a second end and a cam surface between the first end and the second end, wherein the first end is coupled to the switch lock; and a shaft having a first end and a second end, wherein the first end of the shaft is rotatably coupled to the bezel and wherein the second end of the shaft is seated on the cam surface of the link, the shaft further having a first position wherein the first position locks the door.

3. The electronics housing of claim 2, wherein the door of the apparatus has a first end and wherein the first end of the door includes a rib and wherein the shaft of the locking mechanism includes a boss on the first end and a gap between the first end and the second end, wherein the door is locked in the first position when the shaft is in the first position and the rib of the door is adjacent to the boss of the shaft;

wherein the door is locked in the second position when the shaft is in the first position and the rib of the door is in the gap of the shaft; and wherein the door is locked in the third position when the shaft is in the first position and the rib of the door is between the second end of the shaft and the link.

4. The electronics housing of claim 3, further comprising:

a plinth door coupled to the electronics housing, the plinth door having a top face, the top face of the plinth door having a hole, wherein a first position of the switch lock locks the plinth door by inserting the second end of the link through the hole in the top face of the plinth door.

5. A locking mechanism apparatus for securing a sliding door, the apparatus comprising:

a slidable door with a protruding rib;

a bezel that covers a portion of the slidable door;

a rotatable switch lock having a first position wherein the first position locks the door;

an axially actuated link having a first end and a second end and a cam surface between the first end and the second end, wherein the first end is coupled to the switch lock;

a shaft having a first end and a second end, and wherein the shaft includes a boss on the first end and a gap between the first end and the second end, wherein the first end of the shaft is rotatably coupled to the bezel and wherein the second end of the shaft is seated on the cam surface of the link, the shaft further having a first position and a second position wherein the first position of the shaft locks the door.

6. The locking mechanism of claim 5, wherein the door is locked in a first position when the shaft is in the first position and the rib of the door is adjacent to the boss of the shaft;

wherein the door is locked in a second position when the shaft is in the first position and the rib of the door is in the gap of the shaft; and wherein the door is locked in a third position when the shaft is in the first position and the rib of the door is between the second end of the shaft and the link.

7. A method for securing a component in an electronics housing, the method comprising the steps of:

coupling an enclosure apparatus to a side portion of the electronics housing, the enclosure apparatus comprising:

a rail attached to the side portion of the electronics housing;

a door with a first end and a second end, the door slidably coupled to the rail;

a bezel with a front portion and a rear portion wherein the bezel is coupled to the electronics housing and covers a portion of the rail;

a locking mechanism coupled to the rear portion of the bezel, the locking mechanism including a rotatable switch lock, an axially actuated link having a first end and a second end and a cam surface between the first end and the second end, wherein the first end is coupled to the switch lock, and a shaft having a first end and a second end, wherein the first end of the shaft is rotatably coupled to the bezel and wherein the second end of the shaft is seated on the cam surface of the link, the shaft further having a first shaft position wherein the first shaft position locks the door;

sliding the door to a position that encloses the component; and rotating the switch lock of the locking mechanism to lock the door.

8. The method of claim 7, wherein the first end of the door of the enclosure apparatus includes a rib and wherein the shaft of the locking mechanism of the enclosure apparatus includes a boss on the first end and a gap between the first end and the second end, wherein the door is locked in a first position when the shaft is in the first shaft position and the rib of the door is adjacent to the boss of the shaft;

wherein the door is locked in a second position when the shaft is in the first shaft position and the rib of the door is in the gap of the shaft; and wherein the door is locked in a third position when the shaft is in the first shaft position and the rib of the door is between the second end of the shaft and the link.

9. The method of claim 8, wherein the electronics housing includes a plinth door coupled to the electronics housing, the plinth door having a top face, the top face of the plinth door having a hole, wherein a first position of the switch lock locks the plinth door by inserting the second end of the link through the hole in the top face of the plinth door.

* * * * *